(12) United States Patent
Giroux

(10) Patent No.: US 6,247,170 B1
(45) Date of Patent: Jun. 12, 2001

(54) METHOD AND DATA PROCESSING SYSTEM FOR PROVIDING SUBROUTINE LEVEL INSTRUMENTATION STATISTICS

(75) Inventor: Michael Giroux, Phoenix, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 0 days.

(21) Appl. No.: 09/316,401

(22) Filed: May 21, 1999

(51) Int. Cl.⁷ ........................................ G06F 9/45
(52) U.S. Cl. ................................. 717/4; 714/38
(58) Field of Search ..................... 717/1–5, 9; 714/37, 714/38, 39

(56) References Cited

U.S. PATENT DOCUMENTS

| | | | |
|---|---|---|---|
| 5,732,272 | * 3/1998 | Gochee | 395/704 |
| 5,768,592 | * 6/1998 | Chang | 395/704 |
| 5,828,883 | * 10/1998 | Hall | 395/704 |
| 6,002,872 | * 12/1999 | Alexander, III et al. | 395/704 |
| 6,049,666 | * 4/2000 | Bennett et al. | 395/704 |

OTHER PUBLICATIONS

Carleton et al., "Profile–Guided Optimizations", Dr. Dobb's Journal, May 1998, start p. 98.*
Levin, "Testing's New Wave", InfortmationWeek, Aug. 1997, pp. 1–4.*

* cited by examiner

Primary Examiner—Kakali Chaki
(74) Attorney, Agent, or Firm—B. E. Hayden; J. S. Solakian

(57) ABSTRACT

Instrumentation statistics are tallied at the procedure level in instrumentation stack frames corresponding to subroutine stack frames. Elapsed CPU time for each entry into a procedure is computed and accumulated into a statistics table corresponding to that procedure. Also accumulated into that statistics table are the accumulated elapsed execution times of the subroutines called by this procedure. These values are initially accumulated into the instrumentation stack frame for each subroutine's parent upon subroutine exit, and then accumulated into the statistics table upon subroutine exit of the parent. Elapsed CPU time is computed by subtracting CPU time of last dispatch from the current hardware clock, then adding this to an accumulated CPU time at the time of dispatch.

20 Claims, 3 Drawing Sheets

METHOD AND DATA PROCESSING SYSTEM FOR PROVIDING SUBROUTINE LEVEL INSTRUMENTATION STATISTICS

FIELD OF THE INVENTION

The present invention generally relates to computer software, and more specifically to procedure level computer software program instrumentation.

BACKGROUND OF THE INVENTION

It is well known in computer science that programs tend to spend 90% of their time executing 10% of the code. The corollary of this is that if a programmer can speed up this 10% of the code by say 100%, then the resulting program will run almost 100% faster, without the necessity of touching any of the rest of the code.

Determining exactly where a program spends its time when executing is thus important. Many programmers believe that they can determine this by looking at the program and guessing. They are usually wrong. Experience has shown that the only real way to determine the part of code that a program tends to execute is through performance measurements.

Often these days crude performance-monitoring tools are provided with modem operating systems. For example, Microsoft Windows NT 4.0 provides both a Performance Monitor tool and a Task Monitor tool. The later tool provides real-time statistics on how much processor resources are currently being utilized by the active programs and tasks running in the system. This allows an analyst to determine which programs and which parts of the operating system are being utilized. This sort of measurement is fairly gross, and is typically gathered through the system dispatcher. Neither tool provides the fine-grained performance statistics necessary in determining where to optimize a program.

In order to gather finer performance statistics, measurement, or instrumentation code is often compiled or link/edited into programs whose performance is to be measured. At its simplest, the instrumentation code counts how often a function or procedure is invoked. This can be done by incrementing a counter whenever the function or procedure is entered. This type of instrumentation usually results in more precise and finer grained measurements than are typically available today through dispatcher based measurements.

One problem that arises in some situations from this sort of counterbased measurement is that procedure or function invocation counts do not translate directly into the time being spent in a particular part of the code.

It would therefore be useful to have available to programmers and analysts the ability to perform fine grained-instrumentation in which it can be determined accurately where a program spends most of its time during execution.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

Instrumentation statistics are tallied at the procedure level in instrumentation stack frames corresponding to subroutine stack frames. Elapsed CPU time for each entry into a procedure is computed and accumulated into a statistics table corresponding to that procedure. Also accumulated into that statistics table are the accumulated elapsed execution times of the subroutines called by this procedure. These values are initially accumulated into the instrumentation stack frame for each subroutine's parent upon subroutine exit, and then accumulated into the statistics table upon subroutine exit of the parent. Elapsed CPU time is computed by subtracting CPU time of last dispatch from the current hardware clock, then adding this to an accumulated CPU time at the time of dispatch.

Figure 1:
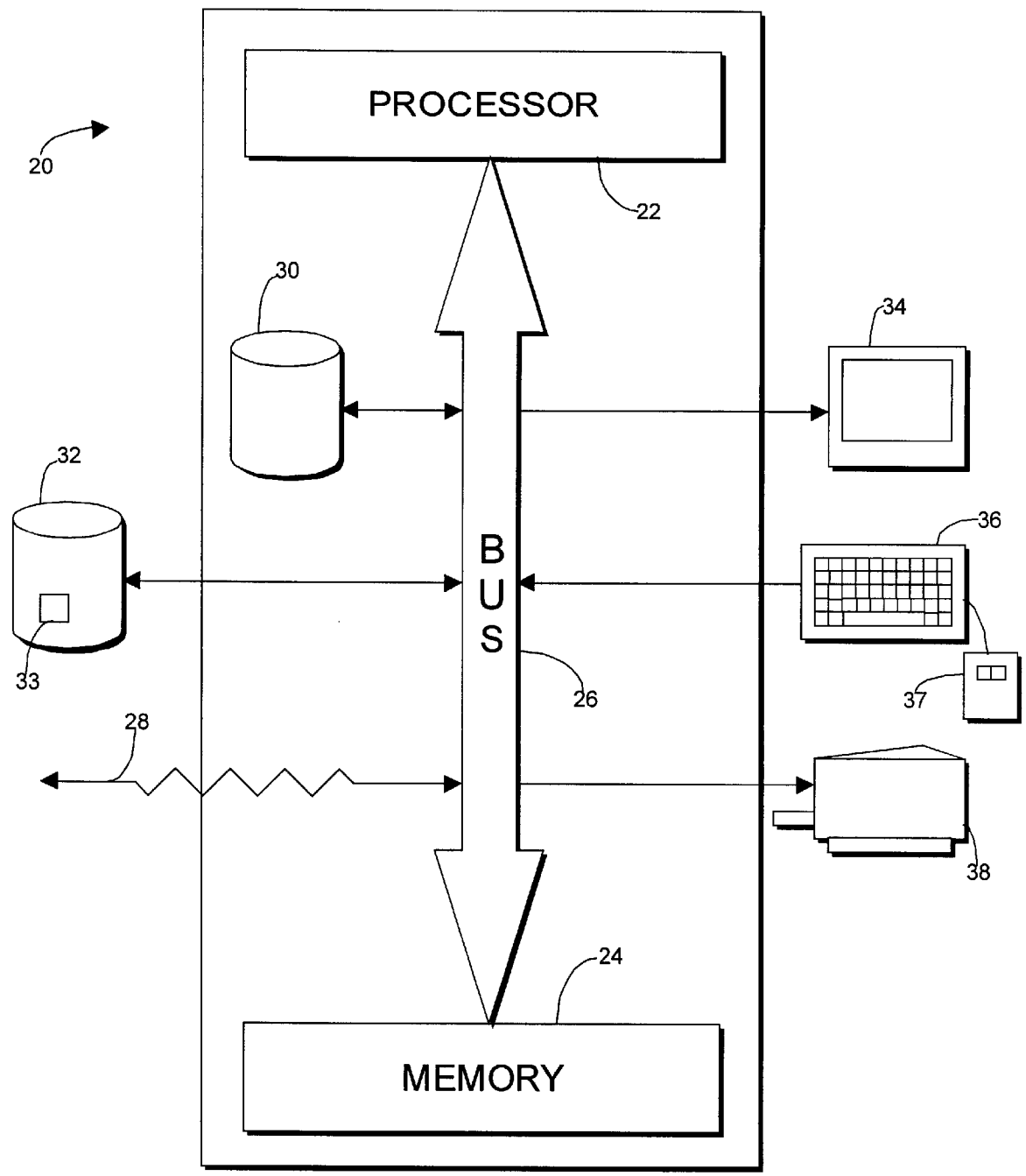
FIG. 1 is a block diagram illustrating a General Purpose Computer, in accordance with the present invention.

FIG. 1 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard 36 with a mouse 37, and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such as test programs, operating systems, and user programs can be stored in a Computer Software Storage Medium, such as memory 24, Secondary Storage 30, and External Storage 32. Executable versions of computer software 33 can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Computer programs typically operate by calling subroutines or procedures for execution, which in turn call lower level subroutines or procedures. This continues until the lowest level subroutines or procedures are called, which are typically the modules that do the actual work of the computer program. This paradigm logically lends itself to being implemented through a subroutine or procedure stack where arguments are pushed onto a stack by a calling routine. This stack paradigm is especially useful in implementing block structured, or "Algol" descended, languages such as C, C++, Java, Pascal, and PL/1.

In the typical implementation of a block structured layered environment, a calling routine will push arguments onto the subroutine stack, and then invoke (or call) the called routine. Upon being called, the called routine first executes "Preamble" code which pushes return information (such as a return address) onto the subroutine stack, and adjusts the subroutine stack to take into account the called routine's use of the subroutine stack. At the end of execution of the subroutine or procedure, "Postamble" code is executed which sets up to return any necessary function values, cuts back the subroutine stack as necessary, and returns to the calling routine. This later action includes modifying the program environment to that of the calling routine.

Figure 2:
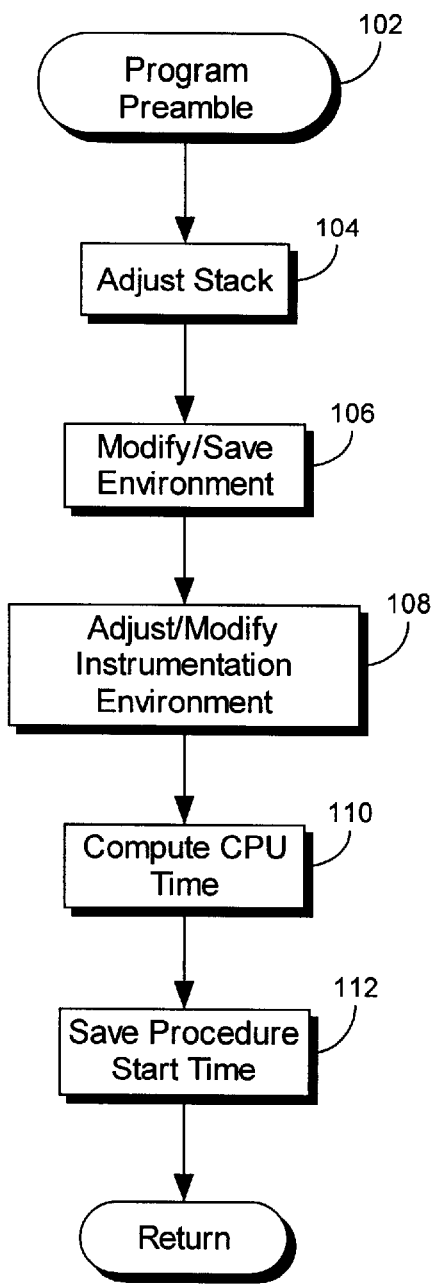
FIG. 2 is a flowchart illustrating subroutine Preamble code, in accordance with a preferred embodiment of the present invention.

FIG. 2 is a flowchart illustrating subroutine Preamble code, in accordance with a preferred embodiment of the present invention. The Preamble starts by adjusting the subroutine stack 210 (see FIG. 4), step 104. The environment for the calling routine is saved into a stack frame 212 in the subroutine stack 210, step 106.

A new instrumentation environment for the called subroutine is then initialized, step 108. In the preferred embodiment, a second, Instrumentation Stack 220 (see FIG. 4) is utilized in parallel with the standard Subroutine Stack 210. A new Instrumentation Stack Frame 222 in the Instrumentation Stack 220 is created by appropriately adjusting Instrumentation Stack Pointers 224. Tallies 234 for called routines ("children") are zeroed in the newly allocated Instrumentation Stack Frame 222. A pointer to a set of static locations for the called procedure is also stored in the Instrumentation Stack Frame 222. In the preferred embodiment, this pointer is an index into a virtual memory array 240, with the start address of the called routine utilized as an index into the array. In an alternate embodiment, the start address of the called routine is utilized as a hash key into a hash table of linked static subroutine tables, with one such static subroutine table for each subroutine or procedure entered. In the preferred embodiment, a pointer 238 to the corresponding Subroutine Stack Frame 212 is established in the Instrumentation Stack Frame 222 for use in cutting back the Instrumentation Stack 220 during Postamble processing (see FIG. 3).

A Starting Elapsed CPU Time is computed, step 110, and stored 234 (see FIG. 4) in the Instrumentation Stack Frame 222 for the called routine, step 112. In the preferred embodiment, the elapsed CPU time is computed efficiently by utilizing two values available to the user program: a Starting Calendar Clock value, and a Cumulative CPU Time Utilized value. The Starting Calendar Clock value is the value of a Calendar Clock at the time of dispatch. It is subtracted from the current value of the Calendar Clock to compute the amount of CPU time utilized by this program since its last dispatch. This CPU time utilized since last dispatch is added to the Cumulative CPU Time Utilized value for the program. In the preferred embodiment, the Starting Calendar Clock value is set by the operating system from the Calendar Clock at each program dispatch. Then, the operating system increments the Cumulative CPU Time Utilized value at the end of each program dispatch by the difference between the current Calendar Clock value and the Starting Calendar Clock value. One advantage of having the operating system update this value at the end of a dispatch and making both the Cumulative CPU Time Utilized and the Starting Calendar Clock value visible to user programs is that it is not necessary to interrupt the operating system in order to force a dispatch to get current CPU utilized values. The Cumulative CPU Time Utilized value is required for CPU accounting, so no additional overhead is required to make it visible to user programs. In an alternative embodiment, elapsed time is utilized. However, this tends to result in inconsistent results since this metric is affected by system dispatch algorithms, delays for physical I/O, and other factors. Finally, at the end of the Preamble code, execution continues with the rest of the subroutine or procedure just called.

Figure 3:
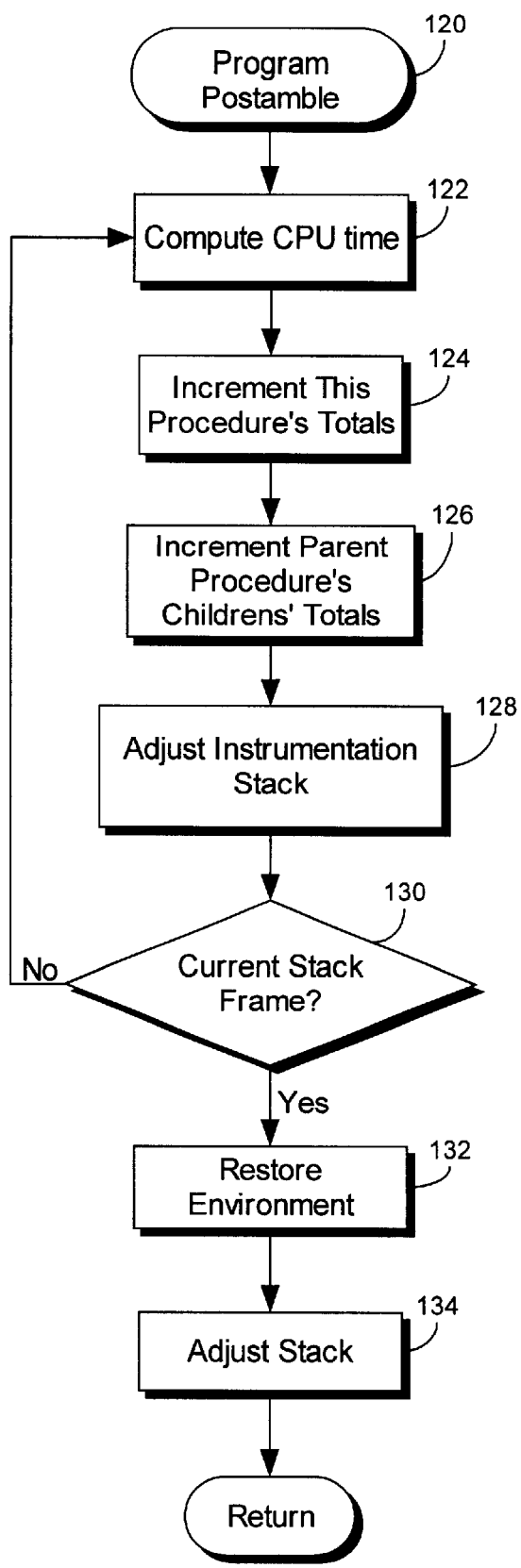
FIG. 3 is a flowchart illustrating subroutine Postamble code, in accordance with a preferred embodiment of the present invention.

FIG. 3 is a flowchart illustrating subroutine Postamble code 120, in accordance with a preferred embodiment of the present invention. A loop is entered and the elapsed CPU time for this instrumentation stack frame 222 (see FIG. 4) is computed, step 122. In the preferred embodiment, this is done by computing a current CPU time in a similar manner as utilized in step 110. The elapsed CPU time for this procedure or subroutine invocation is then computed by subtracting the start time stored in a Start Time field 236 in the current Instrumentation Stack Frame 220 in step 112 of the Preamble code from the current CPU time just computed. This elapsed CPU time for this procedure or subroutine invocation is tallied into a static cell in memory 24 that corresponds to the entry point of the procedure or subroutine that is in the process of returning, step 124. The elapsed CPU time for this procedure or subroutine invocation is also tallied into the Called routine or ("childrens") field 234 in its parent procedure's Instrumentation Stack Frame 222, step 126. The Instrumentation Stack 220 is then adjusted to point at the previous Instrumentation Stack Frame 222, step 128. A test is then made whether the Instrumentation Stack Frame 222 being closed out corresponds to the Subroutine Stack Frame 212 being closed out in this Postamble code execution, step 130. This test can be done by comparing the Subroutine Stack Pointer 238 in the Instrumentation Stack Frame 222 with the register or pointer 214 currently being utilized to address the Subroutine Stack Frame 212. The purpose of this test is to properly handle long jumps and event signaling, either of which can result in multiple Subroutine Stack Frames 212 being bypassed as the program unwinds to the desired Subroutine Stack Frame without going through the normal subroutine exit mechanism. The loop is repeated, starting at step 122, until the Instrumentation Stack Frame 222 corresponding to the current Subroutine Stack Frame 212 is cut back. At that time, the loop exits. The environment from the previous subroutine or procedure is restored from the Subroutine Stack Frame 212, step 132, and the Subroutine Stack 210 is cut back to point at the previous Subroutine Stack Frame 212, step 134. Return is then made to the parent procedure or subroutine.

The Preamble and Postamble code are implemented as standard library subroutine calls in the preferred embodiment. In other embodiments, the Preamble and/or the Postamble are implemented as inline code. One advantage of calling common code to perform the Preamble and Postamble functionality is that Preamble and Postamble routines with and without the instrumentation code can be selectively link-edited into an application program, without the need to recompile and reassemble in order to include or not include the instrumentation code. Another advantage is that generated application code need not be aware of the metering logic and the format of the metering stack. Thus, different types of metering may be utilized without the necessity of recompiling higher level language modules and modifying assembler code modules. Also, metering can be implemented even when source code is no longer modifiable or compilable.

Another feature is that in the preferred embodiment, instrumentation can be selectively enabled or disabled. This is done in the preferred embodiment at program initialization time by modifying the Preamble and Postamble library routines to either return at the end of standard code, or drop into the instrumentation code. This selectivity is accomplished by modifying code to replace a jump instruction with a NOP instruction when instrumentation is desired. The result of this implementation is that disabled instrumentation code has zero runtime overhead. As an alternative, a test of a global flag and a conditional branch instruction can replace the unconditional branch at the bottom of the standard library code in the preferred embodiment. This implementation has an advantage of eliminating self-modifying code, at the expense of the flag testing and conditional jump instructions. Other alternatives are within the scope of this invention. In any of these cases, the instrumentation code can be enabled and disabled on a per-run basis. This is done in the preferred embodiment utilizing JCL switches.

Figure 4:
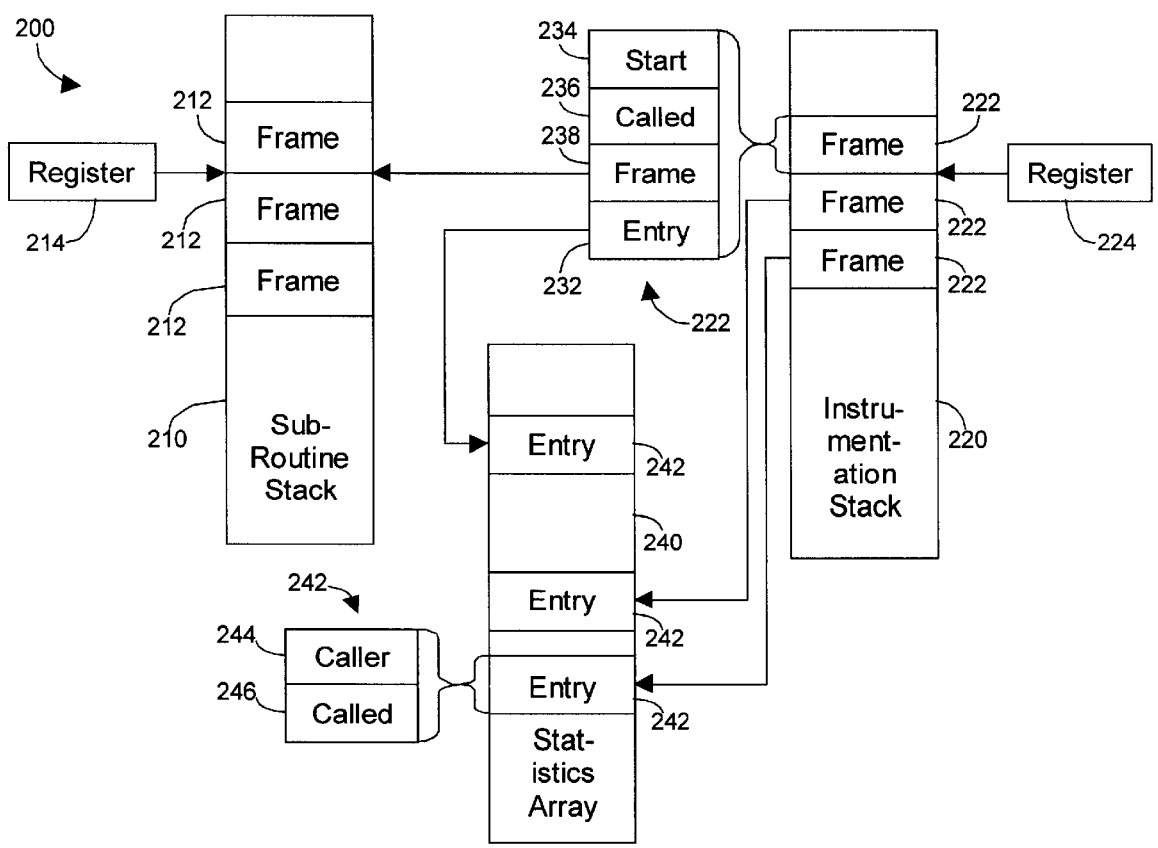
FIG. 4 is a block diagram illustrating data structures in memory, in accordance with a preferred embodiment of the present invention.

FIG. 4 is a block diagram illustrating data structures in memory 24, in accordance with a preferred embodiment of the present invention. A Subroutine Stack 210 consists of a plurality of Subroutine Stack Frames 212 stored in memory. Typically, a register 214 or set of registers is utilized to efficiently access the current Subroutine Stack Frame 212. The pointers or register(s) 214 are adjusted whenever a subroutine or procedure is entered (see FIG. 2) or exited (see FIG. 3). Different computer architectures utilize different mechanisms for managing Subroutine Stacks 210.

A second stack, an Instrumentation Stack 220, stored in memory 24, is utilized in the preferred embodiment. It should be noted that in alternative embodiments, the Subroutine Stack 210 and Instrumentation Stack 220 are combined into a single stack in memory 24. The Instrumentation Stack 220 comprises a plurality of Instrumentation Stack Frames 222 stored in memory 24. Each of the Instrumentation Stack Frames 222 corresponds to a Subroutine Stack Frame 212. In FIG. 4, referencing the Instrumentation Stack Frames 222 is done utilizing a register 224 which is modified upon procedure or subroutine entry and exit. In the implemented embodiment however, pointers to the Instrumentation Stack 220 are stored at fixed locations in memory 24, and registers 224 are only utilized to access the Instrumentation Stack 220 and its stack frames 222 on a transient basis.

Each Instrumentation Stack Frame 222 contains a plurality of elements or fields. One field is the address of the Entry Point Address 232 of the subroutine or procedure being entered (in the case of Preamble code) or exited (in the case of Postamble code). In the preferred embodiment, this Entry Point Address 232 is utilized to identify a location in which static statistics for the subroutine or procedure are stored. Secondly, there are one or more Called Routine Statistics fields or cells 234 for tallying instrumentation statistics for "Called" (or "children") routines. In the preferred embodiment, aggregate execution time for the next level of called routines is tallied in the Called Routine Statistics field(s) 234. However, in alternative embodiments, collection of other instrumentation data is within the scope of the present invention. For example, the number of subroutines or procedures called by this procedure can be tallied. Thirdly, the subroutine or procedure start time for this entry into the subroutine or procedure is saved in a Start Time field 236 in the Instrumentation Stack Frame 222. The Start Time field 236 is utilized in the Postamble code (see FIG. 3) in order to compute the elapsed time that a given invocation of the subroutine or procedure was active, step 122 (FIG. 3). In an alternate embodiment, the entry address of each subroutine called can be recorded. This would allow production of call trace reports. Finally, there is a Subroutine Stack Pointer field 238 containing a pointer to the corresponding Subroutine Stack Frame 212 that corresponds to this Instrumentation Stack Frame 222. This Subroutine Stack Pointer field 238 is utilized to guarantee that the Instrumentation Stack 220 is cut back to correspond with the Subroutine Stack 210 when more than one Subroutine Stack Frames 212 are cut back at the same time. This happens as a result of long jump and event processing mechanisms that result in the Subroutine Stack 210 being unwound without going through the exit Postamble. While this sort of programming is contrary to modem structured design paradigms, it often does exist, and preferably is supported, especially in legacy systems.

A Statistics Array 240 is an array in virtual memory in the computer system. The Statistics Array 240 contains a plurality of Entry Items 242, with one Entry Item 242 for each function or subroutine being instrumented. In the preferred embodiment, the entry point of the subroutine or procedure being instrumented, stored in the Entry Point Address field 232 in the Instrumentation Stack frames 222, is utilized as an index into the Statistics Array 240. This provides an extremely efficient mechanism for identifying the Entry Item 242 corresponding to a given subroutine or procedure. In an alternative embodiment, the entry point address is hashed utilizing an extensible hash table, and the resulting hash index utilized to hash to the corresponding Entry Item 242. Usage of other data structures providing rapid access to individual Entry Item 242 are also within the scope of this invention. Each Entry Item 242 contains a Caller field or fields 244 and a Called field or fields 246. The elapsed time for execution of a subroutine or procedure is accumulated in the Caller field(s) 244 of its Entry Item 242. The accumulated elapsed time for execution of the subroutines or procedures called is accumulated in the Called field(s) 246. This later is accomplished by accumulating the contents of the Called field(s) 236 from the Instrumentation Stack Frame 222 for the subroutine or procedure being instrumented during Postamble processing, step 124.

One of the advantages of this invention is that collection of CPU and/or elapsed time statistics can be accumulated without need for program modification and without program degradation when metering is not enabled. The software implementing the invention is linked directly into application programs. It can be enabled and disabled externally, for example through use of JCL switches. It may also be enabled through vendor patches. When linked into an application program, the cost of the instrumentation is zero when the implementation is such that metering is enabled through patches or self modifying code techniques. Alternatively, a first linkage library that includes the instrumentation code can be utilized during program development, and a second linkage library that does not include the instrumentation code can be utilized during production.

Pretty much all modem computer systems provide some sort of real time or calendar clock. In the preferred embodiment, the GCOS 8 computer system CPU provides a hardware Calendar Clock that is extremely stable, reliable, and accurate. It provides time at a granularity of $10^{-6}$ seconds. This level of granularity provides for extremely precise identification of high-use functions. The less granular the clock, the more ambiguous the resulting data will be.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A method of computing performance statistics for a computer program comprising a plurality of routines, wherein:
   said method comprises:
   A) invoking a second routine from a first routine, wherein:
      the first routine and the second routine are ones of the plurality of routines comprising the computer program;
      each of the plurality of routines has a first called routine statistics area in a memory;
   B) computing a first statistic for the second routine upon exiting the second routine; and
   C) incrementing the first called routine statistics area for the first routine by a value of the first statistic.

2. The method in claim 1 wherein:
   each of the plurality of routines has a first caller routine statistics area in the memory; and
   said method further comprises:
   D) incrementing the first caller routine statistics area for the second routine by the value of the first statistic upon exiting the second routine.

3. The method in claim 1 wherein:
   each of the plurality of routines has a second called routine statistics area in the memory; and
   said method further comprises:
   D) computing a second statistic for the second routine upon exiting the second routine; and
   E) incrementing the second called routine statistics area for the first routine by a value of the second statistic.

4. The method in claim 1 wherein:
   said method further comprises:
   D) computing a starting statistic upon entering the second routine; and
   E) computing an ending statistic upon exiting the second routine; and
   said computing of a first statistic in step (B) comprises:
      computing a difference between the ending statistic and the starting statistic.

5. The method in claim 4 wherein:
   the starting statistic and the ending statistic are each an elapsed CPU time.

6. The method in claim 5 wherein:
   steps (D) and (E) both comprise:
      determining a current clock time;
      determining a past clock time;
      computing a difference between the current clock time minus the past clock time;
      computing the elapsed CPU time by adding the difference to an accumulated clock time.

7. The method in claim 6 wherein:
   the past clock time is a clock time at a time of last dispatch by an operating system; and
   the accumulated clock time is an accumulated clock time at the time of last dispatch by the operating system.

8. The method in claim 1 wherein:
   said method further comprises:
   D) invoking a third routine from the first routine, wherein:
      the third routine is one of the plurality of routines;
   E) computing the first statistic for the third routine upon exiting the third routine; and
   F) incrementing the first called routine statistics area for the first routine by a value of the first statistic.

9. The method in claim 1 wherein:
   said method further comprises:
   D) invoking a third routine from the second routine, wherein:
      the third routine is one of the plurality of routines;
   E) computing the first statistic for the third routine upon exiting the third routine; and
   F) incrementing the first called routine statistics area for the second routine by a value of the first statistic.

10. The method in claim 1 wherein:
    the first called routine statistics area is in a stack frame;
    each of the plurality of routines has a second called routine statistics area in the memory; and
    said method further comprises:
    D) incrementing the second called routine statistics area for the second routine by a value of the first called routine statistics area for the second routine upon exiting the second routine.

11. The method in claim 10 wherein:
    each one of the plurality of routines includes a static statistics table in the memory containing the second called routine area for that one of the plurality of routines; and
    said method further comprises:
    E) determining a static statistics table pointer for the static statistics table for the first routine; and
    F) accessing the second called routine area in the static statistics table for the first routine by utilizing the static statistics table pointer.

12. The method in claim 11 wherein:
    the determining the static statistics table pointer in step (E) utilizes an entry point address for the first routine as the static statistics table pointer.

13. The method in claim 11 wherein:
    the determining the static statistics table pointer in step (E) comprises:
       hashing into a hash table utilizing an entry point address for the first routine as a hash key.

14. The method in claim 13 wherein:
    the hash table is extensible.

15. The method in claim 11 wherein:
    the static statistics table for each of the plurality of routines further includes a first caller routine statistics area; and
    said method further comprises:
    G) incrementing the first caller routine statistics area for the second routine by the value of the first statistic upon exiting the second routine.

16. The method in claim 1 which further comprises:
    D) writing an event entry identifying the first routine in an event log file stored on a Non-Volatile Storage Medium before returning to the first routine from the second routine.

17. The method in claim 16 wherein:
    the event entry written in step (D) further identifies the second routine.

18. The method in claim 1 wherein:
    the first called routine statistics area is in a stack frame;
    each one of the plurality of routines includes a static statistics table in the memory containing a second called routine area and a first caller routine statistics area for that one of the plurality of routines; and
    said method further comprises:
    D) determining a static statistics table pointer for the static statistics table for the second routine;

E) accessing the second called routine area in the static statistics table for the second routine by utilizing the static statistics table pointer;

F) incrementing the first caller routine statistics area for the second routine by the value of the first statistic upon exiting the second routine; and G) incrementing the second called routine statistics area for the second routine by a value of the first called routine statistics area for the second routine upon exiting the second routine.

19. A data processing system having a Computer Software Storage Medium containing a computer program comprising a plurality of routines, wherein:

each of the plurality of routines is encoded as a set of computer instructions stored in the Computer Software Storage Medium;

said computer program comprising:

a first routine encoded as a first set of computer instructions stored in the Computer Software Storage Medium;

a second routine encoded as a second set of computer instructions stored in the Computer Software Storage Medium;

a third set of computer instructions stored in the Computer Software Storage Medium for invoking the second routine from the first routine, wherein:

each of the plurality of routines has a first called routine statistics area in a memory;

a fourth set of computer instructions stored in the Computer Software Storage Medium for computing a first statistic for the second routine upon exiting the second routine; and a fifth set of computer instructions stored in the Computer Software Storage Medium for incrementing the first called routine statistics area for the first routine by a value of the first statistic.

20. A Non-Volatile Storage Medium containing a computer program comprising a plurality of routines, wherein:

said computer program comprises:

A) a set of computer instructions stored on the Non-Volatile Storage Medium for invoking a second routine from a first routine, wherein:

the first routine and the second routine are ones of the plurality of routines comprising the computer program;

each of the plurality of routines has a first called routine statistics area in a memory;

B) a set of computer instructions stored on the Non-Volatile Storage Medium for computing a first statistic for the second routine upon exiting the second routine; and C) a set of computer instructions stored on the Non-Volatile Storage Medium for incrementing the first called routine statistics area for the first routine by a value of the first statistic.

* * * * *